United States Patent [19]

Wolter et al.

[11] Patent Number: 4,530,769

[45] Date of Patent: Jul. 23, 1985

[54] PROCESS FOR SEPARATING CARBON BLACK FROM AN AQUEOUS SUSPENSION

[75] Inventors: Manfred Wolter; Friedrich-Wilhelm Dorn, both of Hürth; Gero Heymer, Erftstadt; Hans-Werner Stephan, Cologne, all of Fed. Rep. of Germany

[73] Assignee: Hoechst Aktiengesellschaft, Fed. Rep. of Germany

[21] Appl. No.: 479,965

[22] Filed: Mar. 29, 1983

[30] Foreign Application Priority Data

Apr. 23, 1982 [DE] Fed. Rep. of Germany ....... 3215178

[51] Int. Cl.$^3$ .............................................. B01D 29/10
[52] U.S. Cl. .................................... 210/769; 210/770; 423/461
[58] Field of Search ............... 210/225, 702, 703, 704, 210/705, 768, 769, 770, 767; 423/445, 461; 48/215, 197 R; 252/373

[56] References Cited

U.S. PATENT DOCUMENTS

| | | | |
|---|---|---|---|
| 2,746,564 | 5/1956 | Williams | 423/461 |
| 3,039,851 | 6/1962 | Kosewicz et al. | 423/461 |
| 3,756,142 | 9/1973 | Gwilliam | 210/225 X |
| 3,816,332 | 6/1974 | Marion | 48/215 X |
| 4,320,108 | 3/1982 | Wolter et al. | 210/705 X |

OTHER PUBLICATIONS

Rompp, *Chemie-Lexkon*, 8th ed., 1983, p. 2155.
Rompp, *Chemie-Lexkon*, 6th ed., 1966, p. 4074.
Kirk-Othmer *Encyclopedia of Chemical Technology*, 3rd ed., vol. 17, 1982, p. 788.
Grant, J., *Hackhs Chemical Dictionary*, 4th ed., 1969, p. 431.

*Primary Examiner*—Richard V. Fisher
*Assistant Examiner*—W. Gary Jones
*Attorney, Agent, or Firm*—Connolly and Hutz

[57] ABSTRACT

The disclosure relates to a process for the discontinuous separation of a solid consisting predominantly of carbon black from its aqueous suspension by filtration. To this end, the disclosure provides for use to be made of a tube pressure filter which is operated under a final pressure of 30 to 100 bars.

2 Claims, No Drawings

PROCESS FOR SEPARATING CARBON BLACK FROM AN AQUEOUS SUSPENSION

The present invention relates to a process for the discontinuous separation of a solid consisting predominantly of carbon black from its aqueous suspension by filtration with the aid of a pressure filter.

Aqueous carbon black suspensions are obtained, for example, upon subjecting heavy fuel oil or residues originating from petroleum processing to gasification at temperatures between 1100° and 2000° C., under pressure of 10 to 100 bars, with admission of an oxygen-containing gas and steam, if desired, and water-scrubbing the resulting gas stream consisting essentially of carbon monoxide and hydrogen. During the gas scrubbing treatment, ash constituents which originate from the heavy metals contained in petroleum are co-precipitated. The resulting aqueous carbon black suspensions normally contain from 0.5 to 2% solid matter of which at least 97% is carbon black; higher concentrated aqueous carbon black suspensions have a pasty flow behaviour or are compact.

In order to enable use to be made of this carbon black which is present in aqueous suspension of low solid matter content and which has good adsorption properties by reason of its large BET-surface area of about 1000 m$^2$, it is necessary for it to be separated from the water.

To this end, it has been suggested in German Patent DE-PS No. 2 546 072 that the aqueous carbon black suspension should be treated with hydrocarbons rendering the carbon black hydrophobic so that it is easy to separate from water. An adverse effect of this process resides in the fact that the carbon black so separated from the water is obtained in the form of pulverulent or pelletized material which still has up to 90% water and hydrocarbons contained in it. In order to obtain dry carbon black therefrom, it is necessary for the flammable material to be treated with caution in a drying cabinet.

To avoid the adverse effects which are entailed by the use of hydrocarbons, the art provides for the carbon black to be separated from the suspension by filtration which however cannot be effected with the aid of a centrifuge or separator. The reason for this resides in the fact that the viscosity of the carbon black suspension increases as increases its solid matter content. The strong water-binding power of carbon black additionally affects the output of a vacuum rotating filter which can be operated at low efficiency only; the resulting filter cake incidentally contains more than 90% water and drying it is an energetically expensive procedure. In German Patent Specification DE-OS No. 2 606 098, it has been suggested that water should be separated from a carbon black/water-mixture by subjecting this latter to a dynamic squeezing operation using a tape pressure filter. To this end, the individual filter tapes of which at least one is permeable to water are deflected several times through an angle of 90° per passage. In those cases in which an aqueous carbon black suspension containing 2% solid matter is used as feed suspension, a filter cake with 16% solid matter is indeed obtained, but drying it continues to be a rather expensive procedure.

The present invention now provides a process for the discontinuous separation of a solid consisting predominantly of carbon black from an aqueous suspension containing 0.5 to 2% solid matter by filtration so as to obtain a filter cake of high solid matter content enabling the carbon black filtered off therefrom to be subsequently dried with less expense of energy than heretofore. To this end, the invention provides for use to be made of a tube pressure filter which can be operated under a final pressure of 30 to 100 bars. A preferred feature provides for the pressure filter to be operated under a final pressure of 50 to 90 bars.

The good filtration efficiency of the tube pressure filter described, e.g. in U.S. Pat. No. 3,756,142, is practically a result of the high pressure which is exerted through a cylindrical water-impermeable diaphragm upon the suspension inside a vertically suspended tube. The filter cake which consists substantially of carbon black and water is being formed on a filter cloth secured to a concentrically arranged cylindrical supporting frame, whilst filtrate runs off inside the tube formed by the filter cloth and supporting frame. As a result of its voluminous structure, the resulting filter cake which is 2 to 3 mm thick is sufficiently elastic to undergo re-expansion upon the pressing pressure being released, and disintegration into a large number of small, irregularly shaped flat platelets with edges at most 10 mm long. The platelets are mechanically strong and not greasy; it is possible for them to be dried without disintegration e.g. in a rotating furnace. Even on being heated to temperatures higher than 1500° C., the platelets are not liable to disintegrate. In moist condition, the platelets have an apparent density of 600 to 650 g/l; after having been dried at 200° C., they have an apparent density of 180 to 210 grams per liter.

Although all ash constituents become co-separated during filtration, the material obtained in accordance with this invention has parameters which are practically the same as those of carbon black obtained by the addition of hydrocarbons to an aqueous carbon black suspension (cf. e.g. German Patent DE-PS No. 2 546 072), as shown in the following Table.

|  | BET-surface area m$^2$/g | Pore volume ml/g |
|---|---|---|
| Material of invention | 860–910 | 2.5–3.3 |
| Carbon black produced as described in DE-PS 2 543 072 | 1000 | 3.0 |

Filtered in all of the following Examples was an aqueous carbon black suspension with 1% solid matter content (of which 98.5 parts carbon black and 1.5 parts ash) which had been obtained by subjecting synthesis gas to scrubbing treatment; the synthesis gas in turn had been made by subjecting petroleum distillation residues to the SHELL gasification process under pressure (cf. *Hydrocarbon Processing,* volume 52, November 1973, page 181).

EXAMPLE 1 (Comparative Example)

600 l/h aqueous carbon black suspension was filtered using a vacuum rotating drum filter which had a filter surface area of 0.2 m$^2$. Strongly greasy filter cake was continuously removed; it had an average solid matter content of 5.9%. The filter cake was dried at 200° C.; carbon black which had a BET-surface area (cf. Brunauer, Emmet and Teller; J. Amer. Chem. Soc. 60 (1938) 309) of 830±40 m$^2$/g, a pore volume of 2.7±0.2 ml/g, and an apparent density of 150±15 g/l was obtained.

EXAMPLE 2 (Comparative Example)

The aqueous carbon black suspension was filtered using a chamber pressure filter discontinuously operated under a pump pressure of 4.2 bars. The resulting solid glutinous filter cakes contained between 7.6 and 12.5% solid matter. The various filter cakes were dried at 200° C. and carbon black which had a BET-surface area of 850±40 m$^2$/g, a pore volume of 2.9±0.2 ml/g, and an apparent density of 160±20 g/l was obtained.

EXAMPLE 3 (Invention)

The carbon black suspension was filtered using a tube pressure filter with a filling volume of 55 l, as described in U.S. Pat. No. 3,756,142. The final pressure was 100 bars. The operational cycle from filling the tube pressure filter until removal of filter cake therefrom took 6 minutes. The filter cake which was obtained in the form of small ungreasy platelets about 3 mm thick contained 29.2% solid matter. The platelets were dried at 200° C. and carbon black which had a BET-surface area of 860 m$^2$/g, a pore volume of 3.1 ml/g, and an apparent density of 192 g/l was obtained.

EXAMPLE 4 (Invention)

560 l carbon black suspension was filtered using the tube pressure filter of Example 3, in 10 immediately consecutive operational cycles. The final pressure in each cycle was 90 bars. The filter cake which was obtained in the form of small platelets about 2 to 3 mm thick contained 29±1% solid matter. The platelets were dried at 200° C. and carbon black which had a BET-surface area of 875±30 m$^2$/g, a pore volume of 2.9±0.4 ml/g, and an apparent density of 195±15 g/l was obtained.

EXAMPLE 5 (Invention)

Example 3 was repeated but the final pressure was 50 bars. The filter cake which was obtained in the form of platelets about 2 to 3 mm thick contained 21.9% solid matter. The dried platelets had a BET-surface area of 865 m$^2$/g and an apparent density of 187 g/l.

EXAMPLE 6 (Invention)

Example 3 was repeated but the final pressure was 30 bars. The filter cake which was obtained in the form of platelets about 2 to 3 mm thick contained 17.3% solid matter. The dried platelets had a BET-surface area of 875 m$^2$/g and an apparent density of 180 g/l.

We claim:

1. A process for filtering an aqueous suspension containing ash and carbon black as its essential solid constituents, which comprises making synthesis gas by subjecting petroleum distillation residues to a gasification process under pressure, scrubbing the synthesis gas with water with the resultant formation of said suspension, filtering said suspension with the aid of a tube pressure filter arranged in upright position and being operated under a final pressing pressure of 30 to 100 bars with the resultant formation of a filter cake being at least 2 mm thick and containing at least 17% solid matter, releasing the pressing pressure from said tube pressure filter with the resultant re-expansion and disintegration of said filter cake into a plurality of small, irregularly shaped, mechanically strong, ungreasy, flat platelets having an apparent density, in moist condition, of 600 to 650 g/l.

2. The process as claimed in claim 1, wherein the tube pressure filter is operated under a final pressure of 50 to 90 bars.

* * * * *